(12) United States Patent  (10) Patent No.: US 11,870,511 B2
Verschueren et al.  (45) Date of Patent: Jan. 9, 2024

(54) NEAR-FIELD INTERFACE DEVICE

(71) Applicant: NXP B.V., Eindhoven (NL)

(72) Inventors: Pieter Verschueren, Langdorp (BE); Steven Mark Thoen, Blanden (BE)

(73) Assignee: NXP B.V., Eindhoven (NL)

( * ) Notice: Subject to any disclaimer, the term of this patent is extended or adjusted under 35 U.S.C. 154(b) by 316 days.

(21) Appl. No.: 17/206,054

(22) Filed: Mar. 18, 2021

(65) Prior Publication Data

US 2022/0302962 A1 Sep. 22, 2022

(51) Int. Cl.
  *H04B 5/00* (2006.01)
  *H01Q 7/00* (2006.01)
  *A63F 13/245* (2014.01)
  *A63F 13/428* (2014.01)

(52) U.S. Cl.
  CPC ......... *H04B 5/0075* (2013.01); *H04B 5/0025* (2013.01)

(58) Field of Classification Search
  None
  See application file for complete search history.

(56) References Cited

U.S. PATENT DOCUMENTS

| | | | | |
|---|---|---|---|---|
| 6,801,967 B2* | 10/2004 | Nakamura | ............... | G06F 3/038 710/62 |
| 7,531,939 B2* | 5/2009 | Takiguchi | ............ | H04B 13/005 310/318 |
| 8,866,760 B2* | 10/2014 | Corroy | ................. | H04B 13/005 345/173 |
| 9,107,029 B2* | 8/2015 | Zou | .......................... | H04W 4/80 |
| 9,266,022 B1* | 2/2016 | Pasqualone | ........... | A63F 13/211 |
| 9,272,206 B2* | 3/2016 | Weston | .................... | A63F 13/95 |
| 9,320,976 B2* | 4/2016 | Weston | ................... | A63J 21/00 |
| 9,396,378 B2* | 7/2016 | Holz | .................. | G06V 40/1306 |
| 9,425,905 B2* | 8/2016 | Lee | ........................ | H04B 13/005 |
| 9,538,934 B2* | 1/2017 | Ang | ........................ | A61B 5/374 |
| 9,582,948 B2* | 2/2017 | Linnartz | ................ | G07C 9/257 |
| 9,585,098 B2* | 2/2017 | Harada | ................ | H04B 5/0012 |
| 9,674,707 B2* | 6/2017 | Boettcher | ........... | H04L 63/0853 |
| 9,721,489 B2* | 8/2017 | Vartanian | ............... | H04N 23/63 |
| 9,814,973 B2* | 11/2017 | Barney | .................. | A63F 13/69 |
| 9,993,724 B2* | 6/2018 | Barney | .................. | A63F 13/92 |

(Continued)

FOREIGN PATENT DOCUMENTS

| | | |
|---|---|---|
| CN | 105867250 A | 8/2016 |
| CN | 107982911 A | 5/2018 |
| KR | 101465750 B1 | 12/2014 |

OTHER PUBLICATIONS

Huo, Xueliang et al; "A Wireless Tongue-Computer Interface Using Stereo Differential Magnetic Field Measurement"; IEEE Explore; 4 pages (Oct. 22, 2007)2007.

(Continued)

*Primary Examiner* — Tuan A Tran

(57) ABSTRACT

One example discloses a near-field interface device, including: a near-field antenna; a physical port configured to be coupled to a computer; a controller coupled to the antenna and the physical port; wherein the controller is configured to translate a near-field signal received from the near-field antenna into an input command generated by a user; and wherein the controller is configured to transmit the input command to the computer through the physical port.

26 Claims, 6 Drawing Sheets

(56) References Cited

U.S. PATENT DOCUMENTS

| | | | |
|---|---|---|---|
| 10,198,563 B2 * | 2/2019 | Wang | G06F 21/35 |
| 10,313,028 B2 * | 6/2019 | Ishibashi | H04B 13/005 |
| 11,038,556 B1 | 6/2021 | Kerselaers et al. | |
| 2006/0020723 A1 * | 1/2006 | Chia-Chun | G06F 13/385 |
| | | | 710/62 |
| 2011/0299512 A1 | 12/2011 | Fukuda | |
| 2013/0307778 A1 | 11/2013 | Burrell et al. | |
| 2019/0090053 A1 | 3/2019 | Paré et al. | |

OTHER PUBLICATIONS

Razer; "RGB Mouse Pad—Razer Firefly V2"; retreived from the internet https://www.razer.com/eu-en/gaming-mouse-mats/razer-firefly-v2/RZ02-03020100-R3U1; 7 pages (03/09/202PC.
NXP; NxH3670UK Ultra-low power 2.4 GHz Bluetooth Low Energy transceiver for audio streaming, Rev. 3.3, Product Data Sheet; 45 pages (Nov. 13, 2020).

* cited by examiner

NEAR-FIELD INTERFACE DEVICE

The present specification relates to systems, methods, apparatuses, devices, articles of manufacture and instructions for near-field communications.

SUMMARY

According to an example embodiment, a near-field interface device, comprising: a near-field antenna; a physical port configured to be coupled to a computer; a controller coupled to the antenna and the physical port; wherein the controller is configured to translate a near-field signal received from the near-field antenna into an input command generated by a user; and wherein the controller is configured to transmit the input command to the computer through the physical port.

In another example embodiment, the physical port is configured to be coupled to a physical communications cable.

In another example embodiment, the antenna is configured to receive the near-field signal from a structure.

In another example embodiment, the structure is a human body surface of the user.

In another example embodiment, the structure is configured to be held by a human body surface of the user.

In another example embodiment, the structure is a bracelet configured to be attached to at least one of an arm portion, a leg portion, or a trunk portion of the user.

In another example embodiment, the antenna is further configured to receive an additional set of near-field signals from an additional set of structures in physical contact with the user.

In another example embodiment, the antenna is configured to receive the near-field signal from a structure within a near-field signal range of the interface device, but that is not in physical contact with the interface device.

In another example embodiment, the structure is in physical conductive contact with the interface device.

In another example embodiment, the controller in the interface device is configured to automatically pair the interface device with the structure in response to the physical contact.

In another example embodiment, the input command is a binary signal corresponding to a state of a binary switch held by the user.

In another example embodiment, the input command is a variable signal corresponding to a state of a variable control held by the user.

In another example embodiment, the input command is a spatial location of the user.

In another example embodiment, the interface device includes a position sensor configured to identify a spatial location of the user with reference to the interface device; and the input command is the spatial location of the user.

In another example embodiment, the interface device is a pad configured to be coupled to a surface.

In another example embodiment, the pad includes a conductive surface configured to be in contact with a user's body.

In another example embodiment, the antenna is configured to receive the near-field signal from a computer mouse, a keyboard and/or a game controller.

In another example embodiment, the near-field signal is a first near-field signal and the user is a first user; the antenna is configured to receive the first near-field signal from the first user at a first frequency; and the controller is configured to change the first frequency to a second frequency if a second near-field signal is received from a second user at the first frequency.

In another example embodiment, the controller is configured to change the first frequency to the second frequency in response to a command from the user.

In another example embodiment, the controller is configured to detect a presence of the second near-field signal by decoding received near-field data packets.

In another example embodiment, the controller is configured to detect a presence of the second near-field signal by comparing a received signal strength (RSS) at the frequency with a predetermined threshold level RSS.

In another example embodiment, the near-field antenna includes a conductive surface; and the conductive surface is configured to be coupled to the user by non-propagating quasi-static near-field electric-induction signals.

In another example embodiment, the near-field antenna includes an inductive loop; and the inductive loop is configured to be coupled to the user by non-propagating quasi-static near-field magnetic-induction signals.

In another example embodiment, the controller is configured to receive a feedback command from the computer through the physical port; and the controller is configured to translate the feedback command into a near-field signal transmitted from the near-field antenna to the user.

In another example embodiment, the feedback command is at least one of: a haptic feedback, a status message, an optical feedback, or a set of game play data.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
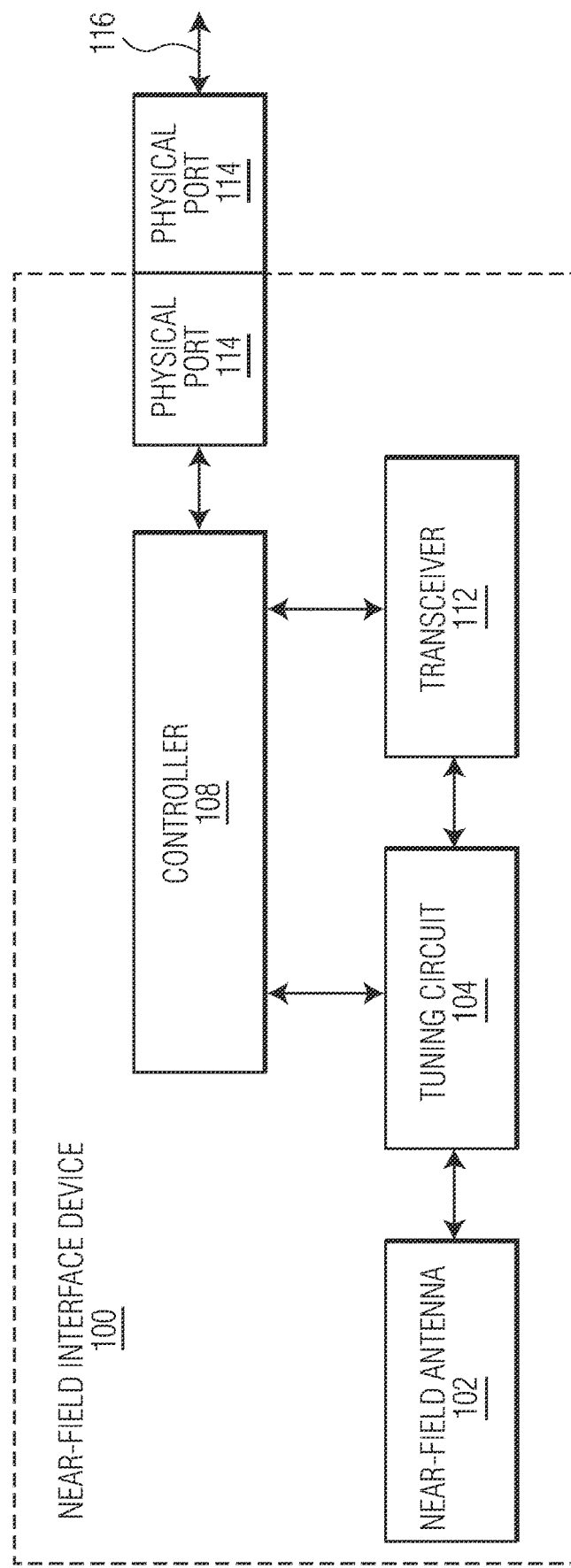
FIG. 1 is an example of a near-field interface device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Computer games typically require many input triggers from multiple players in a crowded environment with spectators who have their own game-play monitoring devices. In such a competitive environment, each user's gaming devices (e.g. controller, mouse, keyboard, etc.) requires an ultra-low latency connection with each of their gaming computers. Latency figures as low as 1 ms are often required.

To attain such a low latency, a high bandwidth connection can be used requiring significant transmit and/or receive times. Custom wireless protocols can also sometimes be used. Such approaches can lead to interference when multiple gamers are in a same room or when gaming in a room where many other wireless devices (e.g. gaming controllers, computers, tablets, etc.) using RF (i.e. far-field) communication systems (e.g. WiFi, Bluetooth, BLE devices and/or dongles) are actively using a same operating frequency band (e.g. all operating in a 2.4 GHz band).

With so many devices simultaneously operating, missed communications packets due to on-air packet collisions can be quite common, thereby causing communication latency to increase even further. As mentioned, latency is one of the most critical parameters for gaming. Packet collisions are hard to avoid, introducing an often unpredictable and inconsistent amount of latency into game play depending on the environment and an instantaneous number of far-field devices all actively communicating at a same time.

Such far-field devices, especially in a crowded multiple player gaming environment, require a rather tedious and complicated pairing process since there are so many devices within range of the far-field devices. Can also be hard to find out which dongle is paired to which headset (or keyboard/mouse). This creates a problem when multiple computer controllers are close by such as when a team of gamers are using a same type of computer equipment making it difficult to find out which controller is paired to which personal computer (PC).

Now discussed is a near-field interface device (e.g. a master node) connected through a wired link with a personal computer and also connected to various other user controlled devices (e.g. a mouse, a keyboard, a game controller, a body-worn device, a bracelet, etc.). The interface device in some example embodiments creates a near-field communication star network. Near-field communication permits a greater number of user body-network devices to communicate with the computer without additional wires and/or without crowding the far-field communication band. Near-field's limited communication range also simplifies pairing and avoids interference from other nearby communications devices.

The near-field interface device uses near-field interactions between one or more near-field devices in a user's hands or on a user's body (i.e. on-body devices), and other conductive surfaces and/or other wireless devices (i.e. off-body devices) based on either near-field electromagnetic induction (NFEMI), where the transmitter and receiver are coupled by both magnetic (H) and electric (E) fields, near-field electric-induction (NFEI), where the transmitter and receiver are coupled by electric (E) fields, and near-field magnetic-induction (NFMI/NFC), where the transmitter and receiver are coupled by magnetic (H) fields. While RF wireless communication is accomplished by propagating an RF plane wave through free space, NFEMI, NFEI, NFMI and NFC communicates using non-propagating quasi-static E and/or H field signals.

In various example embodiments, a first near-field antenna includes a near-field electric-induction antenna (e.g. such as either a NFEI or NFEMI antenna) and is configured for on-body communications. A second near-field antenna includes a near-field magnetic-induction antenna (e.g. such as an NFC antenna) and is configured for off-body communications.

For example, an on-body sensor in the first near-field wireless device can be configured to communicate a gaming sensor's readings to a second on-body near-field wireless device that collects the sensor's readings and perhaps other user information as well.

Note, while example embodiments discussed herein refer to a user's body, on-body and off-body, in alternate embodiments the near-field device 100, "user" and "body" are herein broadly defined to include not only living users/bodies but also non-living user/body structures (e.g. robots).

An H-field antenna (i.e. magnetic antenna) is primarily sensitive to magnetic fields and/or primarily initiates magnetic fields when driven by a current. A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

FIG. 1 is an example of a near-field interface device 100. The example near-field interface device 100 includes a near-field antenna 102, a tuning circuit 104, a controller 108, a transceiver 112 and a physical port 114. The near-field interface device 100 can operate as an NFEMI, NFEI, NFMI, and/or NFC device. Examples of the near-field antenna 102 are presented and discussed in FIGS. 2A and 2B.

The controller 108 is configured to monitor and maintain the device's 100 operational resonance frequency and operational bandwidth/quality factor of the near-field signals (e.g. NFEI or NFEMI) carried by the near-field antenna. The controller 108 is configured to adjust the tuning parameters if either the operational resonance frequency is different from a preselected resonance frequency and/or the operational bandwidth is different from a preselected bandwidth.

The tuning circuit 104 is configured to adjust the device's 100 resonance frequency using a capacitive bank (C-bank), and bandwidth using a resistive bank (R-bank) in response to signals from the controller 108. The C-bank and R-bank discrete components are in some examples about 130 pF and 5000 ohms respectively to support the required resonance frequency (e.g. 10.6 MHz) and bandwidth (e.g. 400 KHz). The controller 108 is configured to adjust (e.g. increment/decrement) the C-bank and R-bank values using the tuning circuit 104.

The transceiver 112 is configured to translate near-field signals received from the antenna 102 into baseband signals (e.g. data packets), and to translate data packets received from the controller 108 into near-field signals to be broadcast by the antenna 102.

The physical port 114 is coupled to the controller 108 and is configured to be coupled to a wire 116 (e.g. physical communications cable) connected to a computer (e.g. a gaming computer). The physical port 114 is a conduit for data packets exchanged between the computer (not shown) and the controller 108.

The controller 108 is configured to translate near-field signals received from the near-field antenna 102 into input commands generated by a user (e.g. a gamer) through the physical port 114 and the wire 116 to the computer. In some example embodiments, the input command is a binary signal corresponding to a state of a binary switch (e.g. one or more click switches) held by the user. The input command could also be a variable signal corresponding to a state of a variable control (e.g. range control, joy stick, scroll wheel, etc.) held by the user. In additional example embodiments the controller 108 is configured to transmit back to the user and their near-field device signals that generate haptic feedback, status messages (e.g. to a hosted watch), LEDs changing color on a gaming controller depending on game play, and similar user feedback signals/messages.

In some example embodiments, the input command could also be a spatial location of the user base for example on a GPS or other spatial sensor hosted by the user. In other example embodiments, the interface device 100 can include its own position sensor configured to identify a spatial location of the user with reference to the interface device 100.

In some example embodiments the interface device 100 can be embedded in a pad structure (e.g. a mouse pad) configured to rest on or be attached to a surface (e.g. a desktop). The pad can include a conductive surface configured to be in contact with a user's body to better support near-field communication.

For example, the antenna 102 in the pad can be configured to receive the near-field signal from a computer mouse, a keyboard or a game controller either in direct contact with the pad or a short distance therefrom. User key-presses, button-clicks, and spatial movements can be either directly detected by the interface device 100 in the pad, or detected by other devices held or in contact with the user, such as a bracelet, the mouse, the keyboard or the game-controller, and then transmitted as data packets and/or input commands to a personal computer via the interface device 100.

Using the near-field signals exchanged between the user and the interface device 100, the controller 108 and computer can be configured to automatically pair each other, either upon direct physical contact of the user (or user held device) and the interface device 100.

Thus by using the near-field communication between the user and the wire connected interface device 100 results in a lower latency and ease of use compared to far-field WiFi dongles, Bluetooth and/or BLE (Bluetooth Low Energy) devices, especially in a crowded gaming environment.

Figure 2B:
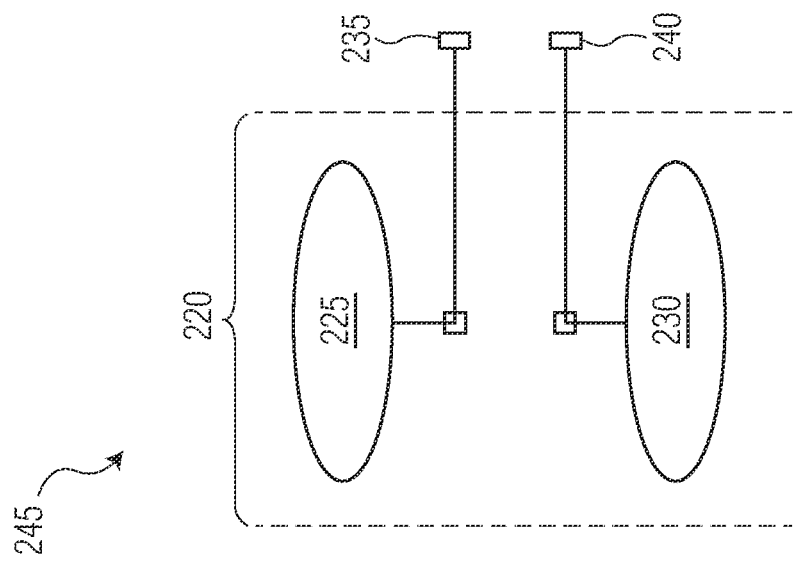
FIG. 2B is a second example near-field antenna in the interface device.
Figure 2A:
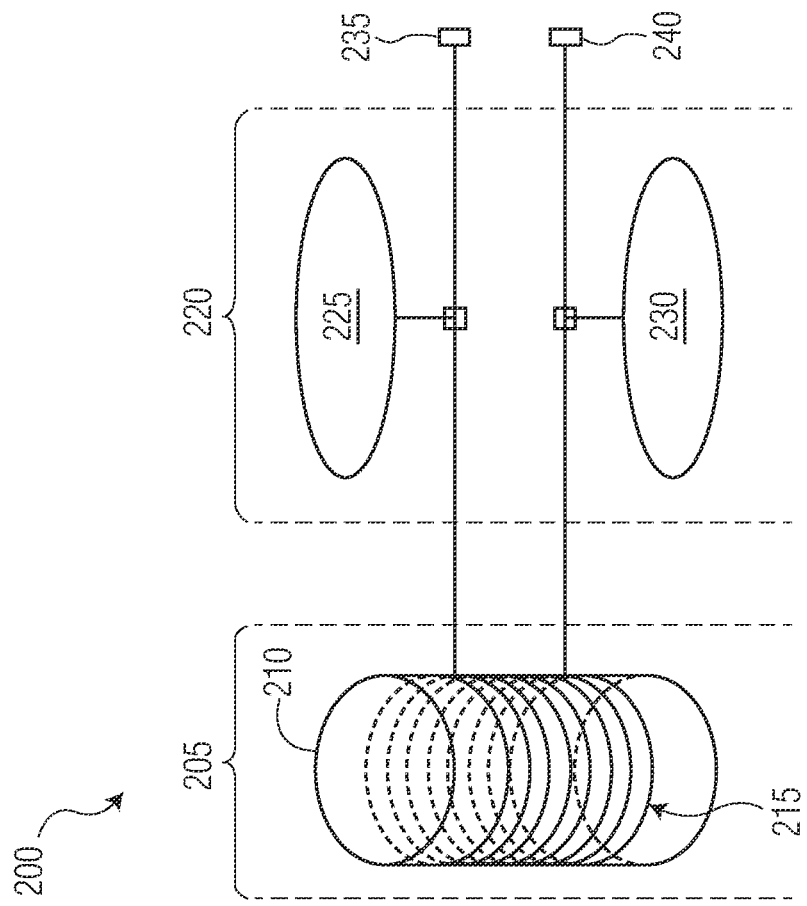
FIG. 2A is a first example near-field antenna in the interface device.

FIG. 2A is a first example 200 near-field antenna 102 in the interface device 100. In this example the antenna 200 is a near-field electromagnetic induction (NFEMI) antenna. In some example embodiments, the antenna 200 includes a coil (H-field) antenna 205 for magnetic fields, in conjunction with a short loaded dipole (E-field) antenna 220 for electric fields. The H-field antenna 205 includes a ferrite core 210 wound with wire 215. The E-field antenna 220 includes two conductive loading surfaces 225 and 230. Antenna 200 feed points 235, 240 are coupled to the tuning circuit 104.

When the NFEMI antenna 200 is proximate to a conductive structure (e.g. a structure having one or more conductive surfaces, a body, a person, an object, etc.) the magnetic and electric fields will be substantially confined to the conductive surface and not significantly radiate in free-space. This enhances security and privacy of such body networked communications.

In various example embodiments, the antenna 200 operates at or below 50 MHz (e.g. for example at 30 MHz) to ensure that the fields are following the conductive surface's contours and to ensure that far field radiation is strongly reduced.

FIG. 2B is a second example 245 near-field (e.g. near-field electro induction (NFEI)) antenna in the interface device 100. The second example near-field antenna 245 consists of just the short loaded dipole (E-field) antenna 220 portion of the first example near-field antenna 200.

Figure 3:
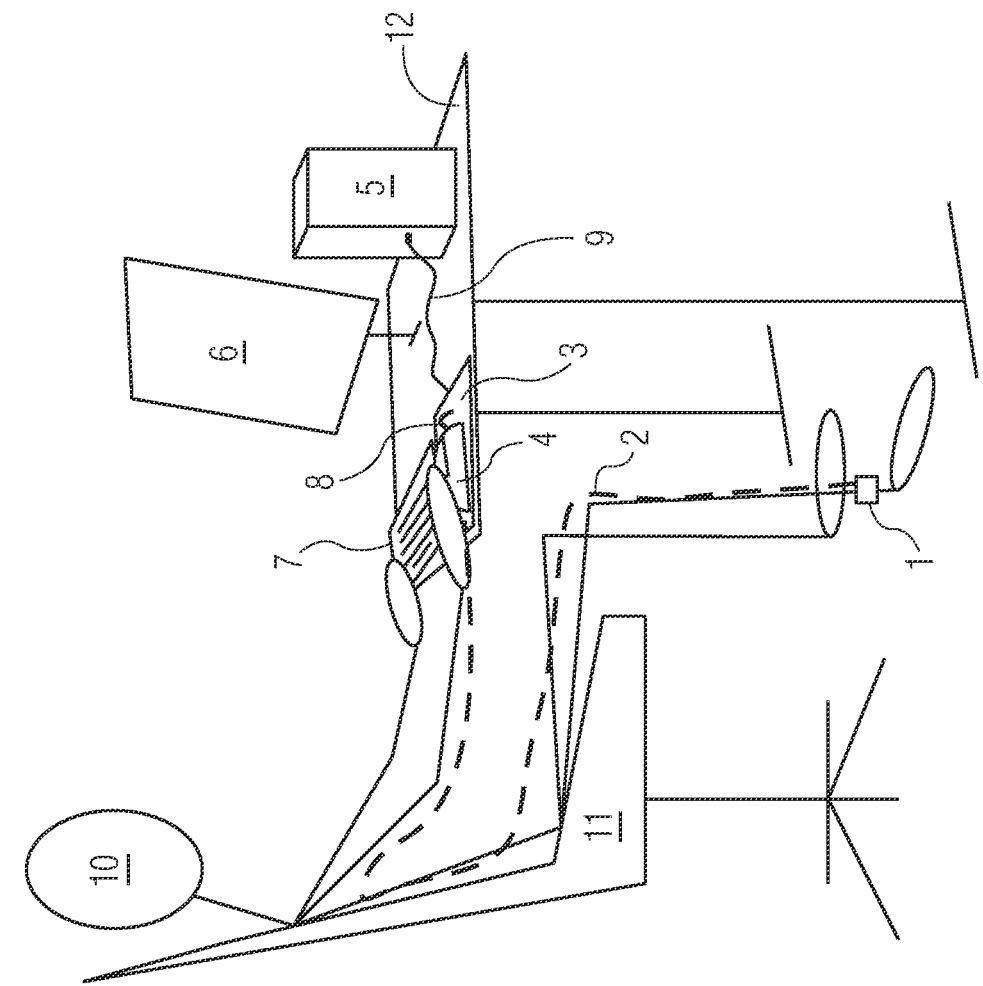
FIG. 3 depicts a first example application of the near-field interface device.

FIG. 3 depicts a first example application 300 of the near-field interface device 100. The example 300 includes: 1: a near-field bracelet, 2: a near-field communications link (dashed line); 3: a near-field mouse mat; 4: a near-field computer mouse; 5: a personal computer (PC); 6: a computer screen; 7: a computer keyboard; 8: a near-field connection; 9: a hard-wire electrical connection (e.g. USB); 10: a user; 11: a chair; and 12: a desk. The near-field communication link 8 is shown between the near-field bracelet 1 and the near-field mouse mat 3. The hard-wire electrical connection 9 is shown between the near-field mouse mat 3 and the computer 5.

The bracelet 1 and mouse 5 in some example embodiments exchange gaming or other commands and information with the mouse mat 4. The mouse mat 4 then exchanges those gaming or other commands and information over the hard-wire 9 to the PC 5. Thus the mouse mat 3 acts as main interface device (e.g. hub) toward the personal computer and also toward the computer mouse 4 and other devices (e.g. bracelet 1) mounted on the user's 10 body or touching the user's 10 body.

The near-field interface device 100 extends the user's 10 computer control capabilities from just moving the mouse 4 or clicking a mouse button, to various body-worn sensors (e.g. bracelet 1) capturing various user 10 specific body movements. In some example embodiments, the mouse 4 can retain some legacy functionality such as an optical position sensor, a track-ball, WiFi capability and so on. An example extension is a second bracelet around the other leg of the user 10 sending both of the user's 10 leg movement and position to the PC 5, thereby further enhancing gameplay (e.g. simulated running, car pedal s for accelerating and braking while driving, flying a plane, defending, etc.).

Figure 4:
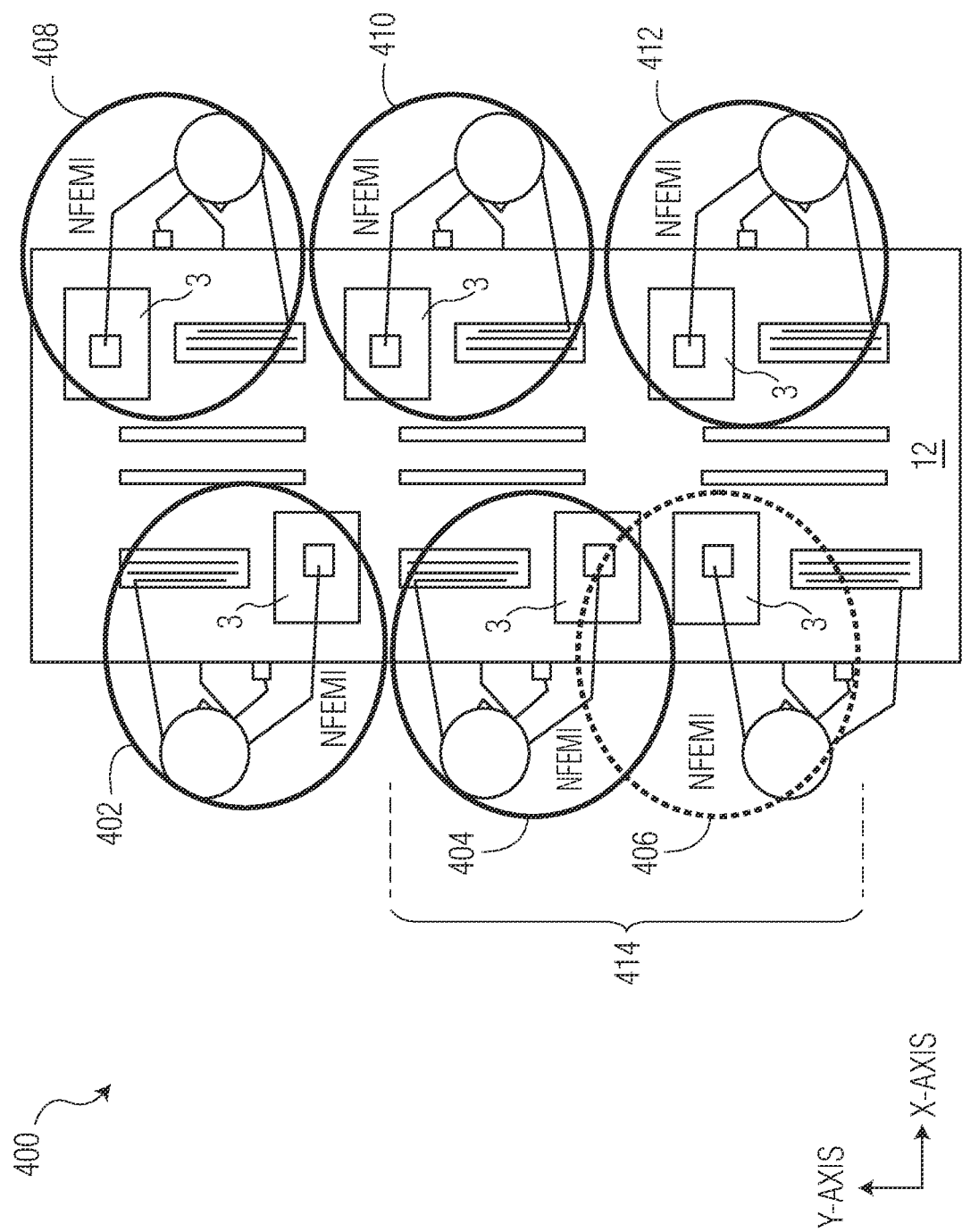
FIG. 4 depicts a second example application of the near-field interface device.

FIG. 4 depicts a second example application 400 of the near-field interface device 100. In this example the near-field interface device is in a multi-user 402, 404, 406, 408, 410, 412 environment.

Benefits of using near-field devices (e.g.) are their localized ambient environment signatures while also covering an entire body of each user. The near-field signals are confined to, the human body and anything (slightly) conductive touching the human body. In general the concern of far-field wireless signal interference is no longer a concern since each of the neighboring devices are communicating with much more local near-field signals.

Another benefit is that no pairing is required. For example if one or more of the users 402, 404, 406, 408, 410, 412 want to switch gaming stations (e.g. PCs), they can keep their personal human interface devices with them, and switch station without need of a complex and timely far-field WiFi/Bluetooth pairing procedure. Instead locating oneself in the near-field communication bubble is sufficient for re-pairing. This provides a convenient and intuitive automatic pairing procedure simply based on location.

Although near-field signals have limited communication distance, such near-field communication distance is not zero. It is still possible to have overlapping 414 communication bubbles. For example user 406 is a left-handed gamer and has moved their near-field mouse mat 3 to the left, while user 404 is a right handed gamer and has their near-field mouse mat 3 on the right. Overlapping near-field mouse mat 3 communication bubbles have thus been created.

In some example embodiments, the near-field overlap 414 is solved by programming the controller 108 in the near-field interface device 100 (e.g. user's 406 mouse mat 3) to switch its operating frequency by a predetermined amount. A different operating frequency band can be selected with a mechanical switch controlled by the user 406 or by implementing a (dynamic) protocol/algorithm to automatically select an alternate operating frequency band when overlap is detected. Such a dynamic protocol can: try randomly another frequency band; communicate with devices in other bubble(s) to agree upon a frequency band to be used; detect if a frequency band is currently occupied or not by detecting unauthorized data packets being transmitted within the band (e.g. from other user devices in other bubbles); and/or measure an overall frequency band energy and determining that a current operating frequency band is occupied (e.g. a received signal strength (RSS) is above a predetermined threshold level RSS). Any threshold level can be calibrated for ambient noise when no users are communicating.

Figure 5:
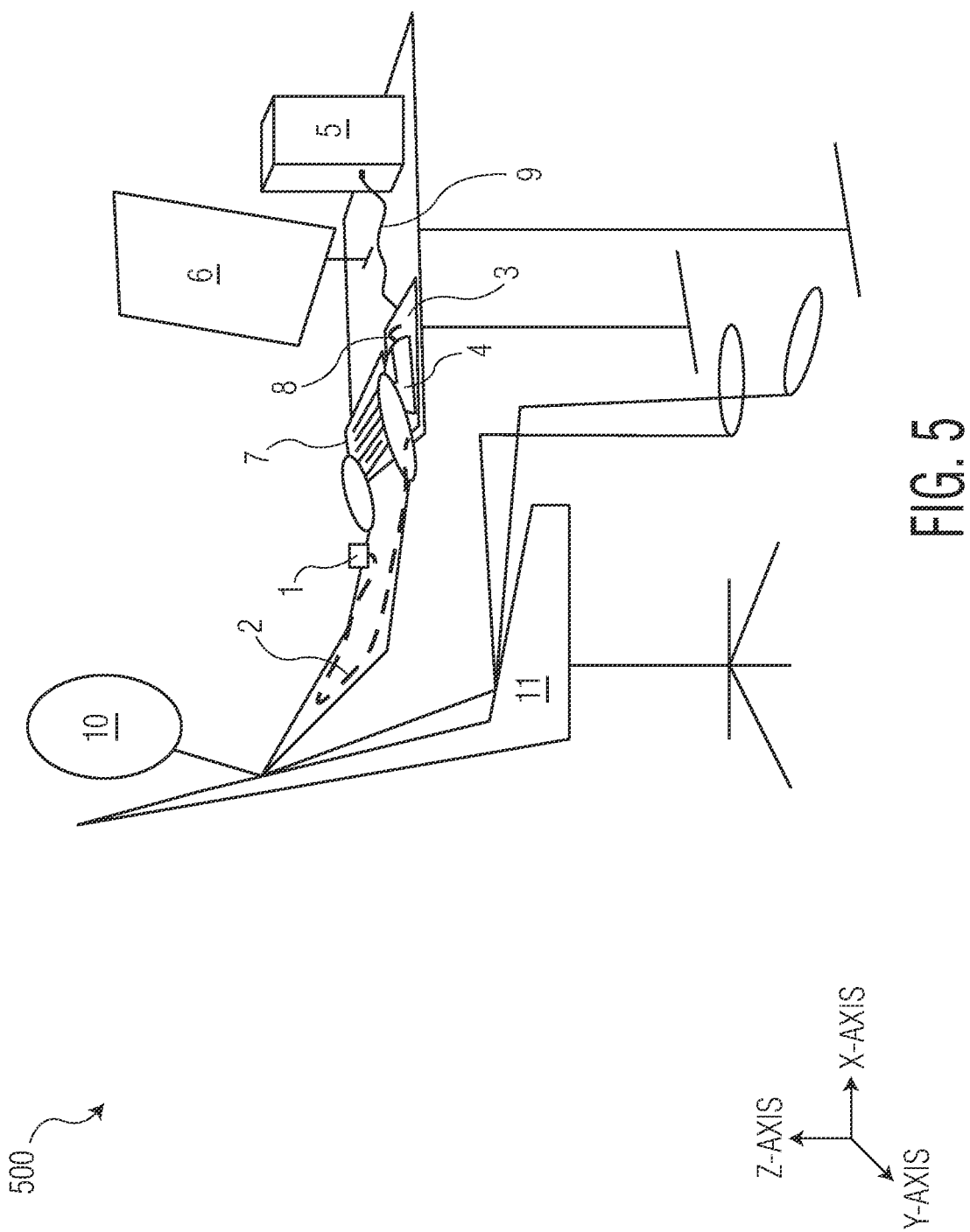
FIG. 5 depicts a third example application of the near-field interface device.

FIG. 5 depicts a third example application 500 of the near-field interface device 100. This example 500 is similar to the example 300 in FIG. 3 except that the near-field bracelet 1 is now on the user's 10 wrist. This third example 500 might be more common in an office (e.g. non-gaming) environment since the user's 10 wrist with the bracelet 1 not operating the mouse 4 is most likely using the keyboard 7 and would not be moved independently of the keyboard 7, thus limiting its gaming capabilities.

However, if the bracelet 1 contains personal identification information, it can be used as an extra layer of protection when locking/unlocking the personal computer 5 (e.g. two-factor authentication). For example, when the user 10 touches the computer mouse 4, the bracelet 1 and the computer mouse 4 form a secure near-field communications network limited to just over the user's 10 body. The bracelet 1 sends its ID to the PC 5 via the mouse 4 or mouse mat 3. The computer 5 will be unlocked if the credentials match with the ones on the personal computer 5. If not, and the computer 5 was still unlocked, the computer 5 could be programmed to lock the computer as an added security benefit.

In another example embodiment of two-factor authentication, a fingerprint sensor can be embedded in the mouse 4 or on the keyboard 7. Using also the user's fingerprint information stored on the bracelet 1 (e.g. a watch), and which is sent to the PC 5, the PC 5 compares the received fingerprint info and the fingerprint scan from its own fingerprint sensor scan received from the mouse 4 or keyboard 7, which should match before granting access.

Figure 6:
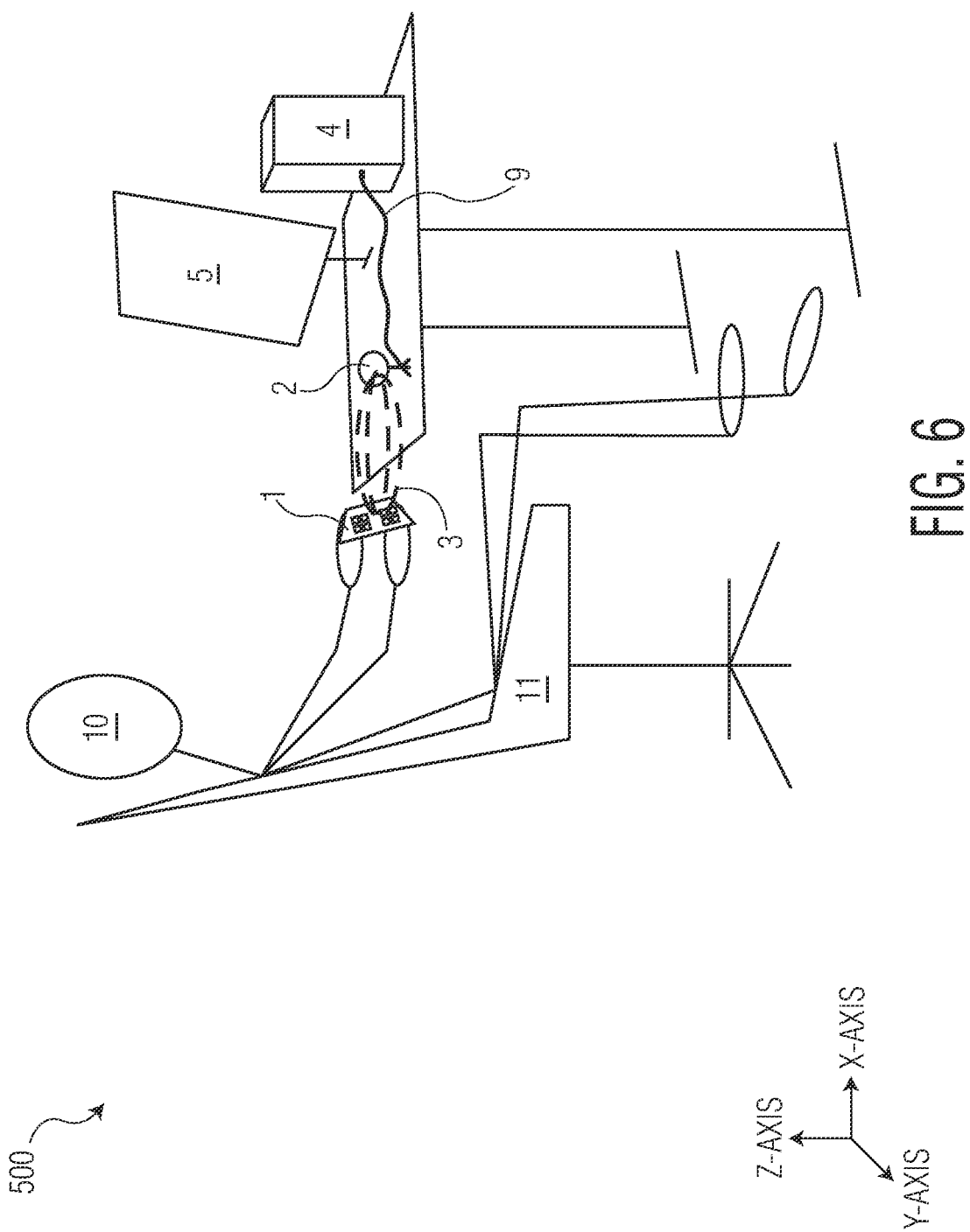
FIG. 6 depicts a fourth example application of the near-field interface device.

FIG. 6 depicts a fourth example application 600 of the near-field interface device 100. The example 600 includes: 1: a near-field wireless gaming controller (WGC) transmitter; 2: a near-field WGC receiver; 3: a near-field communications link; 4: a personal computer; 5: a computer screen; 6: a hard-wire electrical connection; 10: a user; 11: a chair; and 12: a desk. The near-field communication link 3 is shown between the WGC transmitter 1 and the WGC receiver 2. The hard-wire electrical connection 9 is shown between the WGC receiver 2 and the computer 4.

The WGC transmitter 1 and WGC receiver 2 in some example embodiments communicate gaming or other commands and information. The WGC receiver 2 then exchanges those gaming or other commands and information over the hard-wire 9 to the PC 4. Thus the WGC receiver 2 acts as another near-field interface device toward the personal computer and also can be used to communicate with other devices on the user's 10 body or touching the user's 10 body (e.g. the chair 11 perhaps for haptic feedback control).

When the WGC transmitter 1 is within near-field communication range of the WGC receiver 2, the WGC transmitter 1 is automatically connected with the PC 4. However beyond the near-field communications range (e.g. ½ meter bubble for example) communications with the PC 4 is blocked, thereby ensuring that only a nearby user 10 is able to control the PC 4.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field interface device, comprising:
   a near-field antenna;
   a physical port configured to be coupled to a computer;
   a controller coupled to the antenna and the physical port;
   wherein the controller is configured to translate a near-field signal received from the near-field antenna into an input command generated by a user;
   wherein the controller is configured to transmit the input command to the computer through the physical port;
   wherein the near-field antenna includes a conductive surface; and
   wherein the conductive surface is configured to be coupled to the user by non-propagating quasi-static near-field electric-induction signals.

2. The device of claim 1:
   wherein the physical port is configured to be coupled to a physical communications cable.

3. The device of claim 1:
   wherein the antenna is configured to receive the near-field signal from a structure.

4. The device of claim 3:
   wherein the structure is a human body surface of the user.

5. The device of claim 3:
   wherein the structure is configured to be held by a human body surface of the user.

6. The device of claim 3:
   wherein the structure is a bracelet configured to be attached to at least one of an arm portion, a leg portion, or a trunk portion of the user.

7. The device of claim 3:
   wherein the antenna is further configured to receive an additional set of near-field signals from an additional set of structures in physical contact with the user.

8. The device of claim 3:
   wherein the antenna is configured to receive the near-field signal from a structure within a near-field signal range of the interface device, but that is not in physical contact with the interface device.

9. The device of claim 3:
   wherein the structure is in physical conductive contact with the interface device.

10. The device of claim 9:
    wherein the controller in the interface device is configured to automatically pair the interface device with the structure in response to the physical contact.

11. The device of claim 1:
    wherein the input command is a binary signal corresponding to a state of a binary switch held by the user.

12. The device of claim 1:
    wherein the input command is a variable signal corresponding to a state of a variable control held by the user.

13. The device of claim 1:
    wherein the input command is a spatial location of the user.

14. The device of claim 1:
    wherein the interface device includes a position sensor configured to identify a spatial location of the user with reference to the interface device; and
    wherein the input command is the spatial location of the user.

15. The device of claim 1:
    wherein the interface device is a pad configured to be coupled to a surface.

16. The device of claim 15:
    wherein the pad includes a conductive surface configured to be in contact with a user's body.

17. The device of claim 1:
    wherein the antenna is configured to receive the near-field signal from a computer mouse, a keyboard and/or a game controller.

18. The device of claim 1:
    wherein the near-field signal is a first near-field signal and the user is a first user;
    wherein the antenna is configured to receive the first near-field signal from the first user at a first frequency; and
    wherein the controller is configured to change the first frequency to a second frequency if a second near-field signal is received from a second user at the first frequency.

19. The device of claim 18:
    wherein the controller is configured to change the first frequency to the second frequency in response to a command from the user.

20. The device of claim 18:
    wherein the controller is configured to detect a presence of the second near-field signal by decoding received near-field data packets.

21. The device of claim 18:
    wherein the controller is configured to detect a presence of the second near-field signal by comparing a received signal strength (RSS) at the frequency with a predetermined threshold level RSS.

22. The device of claim 1:
    wherein the near-field antenna includes an inductive loop; and
    wherein the inductive loop is configured to be coupled to the user by non-propagating quasi-static near-field magnetic-induction signals.

23. The device of claim 1:
wherein the controller is configured to receive a feedback command from the computer through the physical port; and
wherein the controller is configured to translate the feedback command into a near-field signal transmitted from the near-field antenna to the user.

24. The device of claim 23:
wherein the feedback command is at least one of: a haptic feedback, a status message, an optical feedback, or a set of game play data.

25. A near-field interface device, comprising:
a near-field antenna;
a physical port configured to be coupled to a computer;
a controller coupled to the antenna and the physical port;
wherein the controller is configured to translate a near-field signal received from the near-field antenna into an input command generated by a user;
wherein the controller is configured to transmit the input command to the computer through the physical port;
wherein the near-field antenna includes an inductive loop; and
wherein the inductive loop is configured to be coupled to the user by non-propagating quasi-static near-field magnetic-induction signals.

26. A near-field interface device, comprising:
a near-field antenna;
a physical port configured to be coupled to a computer;
a controller coupled to the antenna and the physical port;
wherein the controller is configured to translate a near-field signal received from the near-field antenna into an input command generated by a user;
wherein the controller is configured to transmit the input command to the computer through the physical port;
wherein the near-field signal is a first near-field signal and the user is a first user;
wherein the antenna is configured to receive the first near-field signal from the first user at a first frequency; and
wherein the controller is configured to change the first frequency to a second frequency if a second near-field signal is received from a second user at the first frequency.

* * * * *